(12) United States Patent
Vogeleisen

(10) Patent No.: US 6,847,814 B1
(45) Date of Patent: Jan. 25, 2005

(54) EMERGENCY PERSONAL DEVICE WITH BASE STATION

(75) Inventor: Marc Vogeleisen, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1225 days.

(21) Appl. No.: 08/970,883

(22) Filed: Nov. 14, 1997

(30) Foreign Application Priority Data

Nov. 22, 1996 (FR) .......................................... 96 14317

(51) Int. Cl.⁷ .......................................... H04M 11/04
(52) U.S. Cl. .................... 455/404.1; 455/462; 455/521; 455/569.1; 379/40; 379/45; 379/38
(58) Field of Search ................. 455/404, 414, 455/462, 463, 521, 404.1, 404.2, 564, 565, 500, 507, 414.1, 569.1; 379/38, 45, 40, 388.01

(56) References Cited

U.S. PATENT DOCUMENTS

| | | | | |
|---|---|---|---|---|
| 4,417,100 A | * | 11/1983 | Carlson et al. | 379/51 |
| 4,870,676 A | * | 9/1989 | Lewo | 455/564 |
| 5,128,979 A | * | 7/1992 | Reich et al. | 379/40 |
| 5,305,370 A | * | 4/1994 | Kearns et al. | 379/45 |
| 5,487,182 A | * | 1/1996 | Hansson | 455/569.1 |
| 5,526,403 A | * | 6/1996 | Tam | 455/426.1 |
| 5,673,304 A | * | 9/1997 | Connor et al. | 379/45 |
| 5,694,452 A | * | 12/1997 | Bertolet | 379/51 |
| 5,712,619 A | * | 1/1998 | Simkin | 340/539.13 |
| 5,802,476 A | * | 9/1998 | Nakajima et al. | 455/462 |
| 5,894,591 A | * | 4/1999 | Tamayo | 340/7.5 |
| 5,960,357 A | * | 9/1999 | Kim | 455/462 |

FOREIGN PATENT DOCUMENTS

| | | | | |
|---|---|---|---|---|
| DE | 4413974 A1 | * 11/1995 | .......... | H04M/11/04 |
| DE | 4413974 A1 | 11/1995 | .......... | 379/37 |
| GB | 2166321 A | 4/1986 | .......... | 379/37 |

* cited by examiner

Primary Examiner—Edward F. Urban
Assistant Examiner—Blane Jackson
(74) Attorney, Agent, or Firm—Dicran Halajian

(57) ABSTRACT

A communication system is disclosed having a wireless telephone and a base station. The wireless telephone has a transceiver, a microphone, a speaker and a keyboard. The base station is connectable to the wireless telephone by a radio link and is connected to a switched network. The keyboard of the wireless telephone includes an emergency key which dials a pre-stored number and activates the microphone and speaker for hands-free operation of the wireless telephone.

2 Claims, 2 Drawing Sheets

EMERGENCY PERSONAL DEVICE WITH BASE STATION

FIELD OF THE INVENTION

The invention relates to a telecommunication arrangement formed by a base station comprising a first circuit for connecting to a network and a second circuit for connecting to a personal device.

The invention likewise relates to a method implemented in such an arrangement.

BACKGROUND OF THE INVENTION

Such devices, known as wireless telephones, are currently used and provide great ease of use to the users by the number of functions they offer to their users.

SUMMARY OF THE INVENTION

The invention proposes an arrangement of the type defined in the opening paragraph which provides a new function which is well adapted to this type of arrangement.

Therefore, such an arrangement is characterized in that said personal device comprises an emergency button.

Thus, this emergency button simply means that by depressing it, the user obtains a line and the dialling of a pre-recorded number.

This advantage is particularly important, especially for the sick elderly people or people suffering from a cardiac disease who can call their doctor in case of problems. The invention, which above all applies to small-sized personal devices, can be used as a substitute for remote monitoring devices used in hospital environments and which are costly.

These and other aspects of the invention will be apparent from and elucidated with reference to the embodiments described hereinafter.

DESCRIPTION OF PREFERRED EMBODIMENTS

Figure 1:
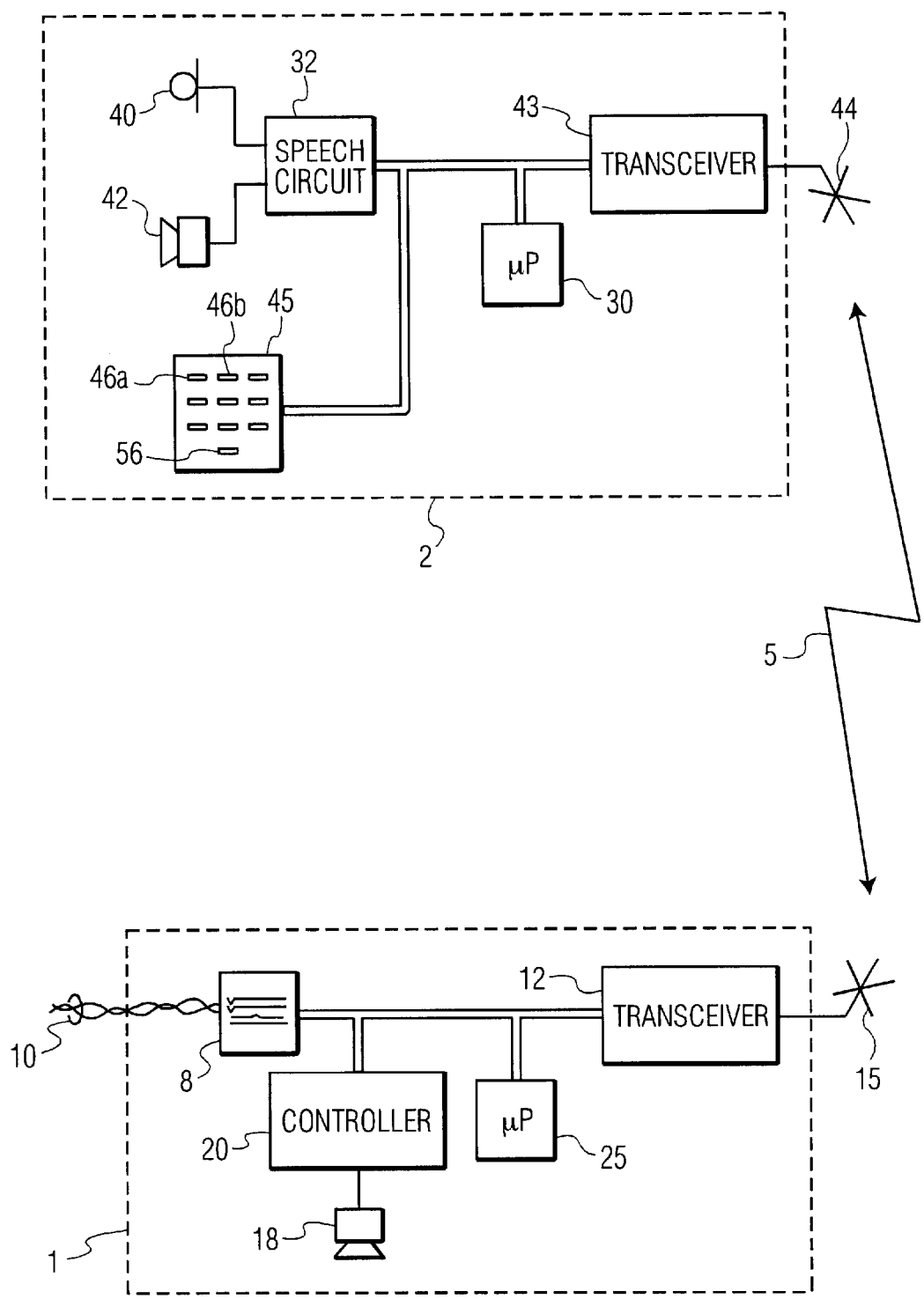
FIG. 1 shows an arrangement according to the invention.

In FIG. 1, the arrangement shown is a wireless CTO telephone. It is formed by two parts: the base station 1 and a personal device 2 which is, in fact, a portable telephone, preferably a small-sized one. The base station 1 and the device 2 can communicate by a radio link represented by an arrow 5.

The base station 1 is connected via a line circuit 8, to the switched network via a telephone line 10. To be able to communicate with the device 2, the base station comprises a transceiver circuit 12 which is connected on the outside to an antenna 15. This base station further includes a loudspeaker 18 notably used for hands-free listening. This loudspeaker is branched off to the output of a loudspeaker control circuit 20. All afore-mentioned elements 8, 20 and 12 are controlled by a management assembly 25 based on a processor running instruction sequences, as this is well known to those skilled in the art for forming the means used by the invention.

The device 2 also comprises a management assembly 30 which controls a speech circuit 32 for a microphone 40 and a loudspeaker 42, a transceiver circuit 43 for the link 5 by an antenna 44. This management assembly 30, formed by a microprocessor, runs instruction sequences for forming the means of the invention. Furthermore, this device 2 has a keyboard 45 with a plurality of keys 46a, 46b. . . .

According to the invention, there is provided an emergency button referenced 56 in FIG. 1.

The operation of such an arrangement is the following.

Figure 2:
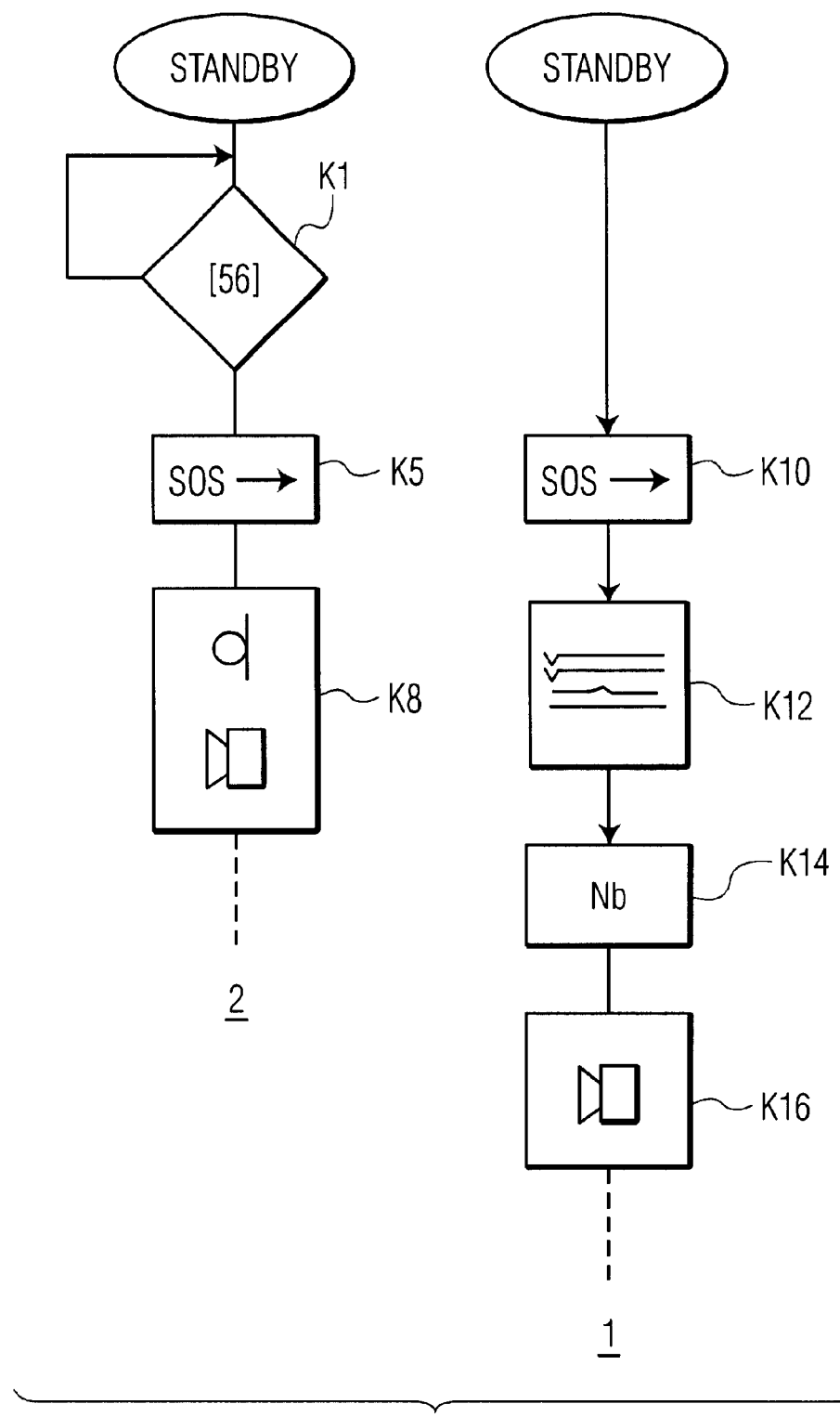
FIG. 2 shows a flow chart which explains the operation of the arrangement shown in the preceding Figures.

FIG. 2 shows a flow chart explaining this operation.

The left-hand part relates to device 2. When the device is in the stand-by mode, that is to say, when it is not engaged in a communication, the depression of the emergency button 56 is continuously examined, which is indicated by box K1 of this FIG. 2. If this button is depressed, a message indicating the emergency is sent to the base station 1 (box K5) and the microphone 40 and the loudspeaker 42 are put in the operation mode (box K8). The operation then takes place in the manner common for this type of arrangement.

The right-hand part of this FIG. 2 relates to the base station 1. Box K10 indicates the reception of an emergency message. This triggers the seizure of a telephone line 12 (box K12) after which the emergency number previously recorded in the management assembly 25 is dialled (box K14). The loudspeaker 18 is immediately put into operation (box K16). The operation then becomes conventional.

The emergency service is contacted and the user may then be helped.

What is claimed is:

1. A communication system comprising:
   a personal device having a transceiver, a microphone, a speaker and a keyboard;
   a base station connectable to said personal device by a radio link, said base station being connected to a switched network;
   said keyboard including an emergency key which dials a pre-stored number and activates said microphone and said speaker for hands-free operation of said personal device; wherein said base station includes a base speaker which is activated by said emergency key.

2. A method of communicating comprising:
   depressing an emergency key of a personal device having a transceiver, a microphone, a speaker and a keyboard;
   dialing a pre-stored number in response to the depressing step;
   activating said microphone and said speaker in response to the depressing step for hands-free operation of said personal device; and
   activating a base speaker of a base station in response to the depressing step.

* * * * *